UNITED STATES PATENT OFFICE.

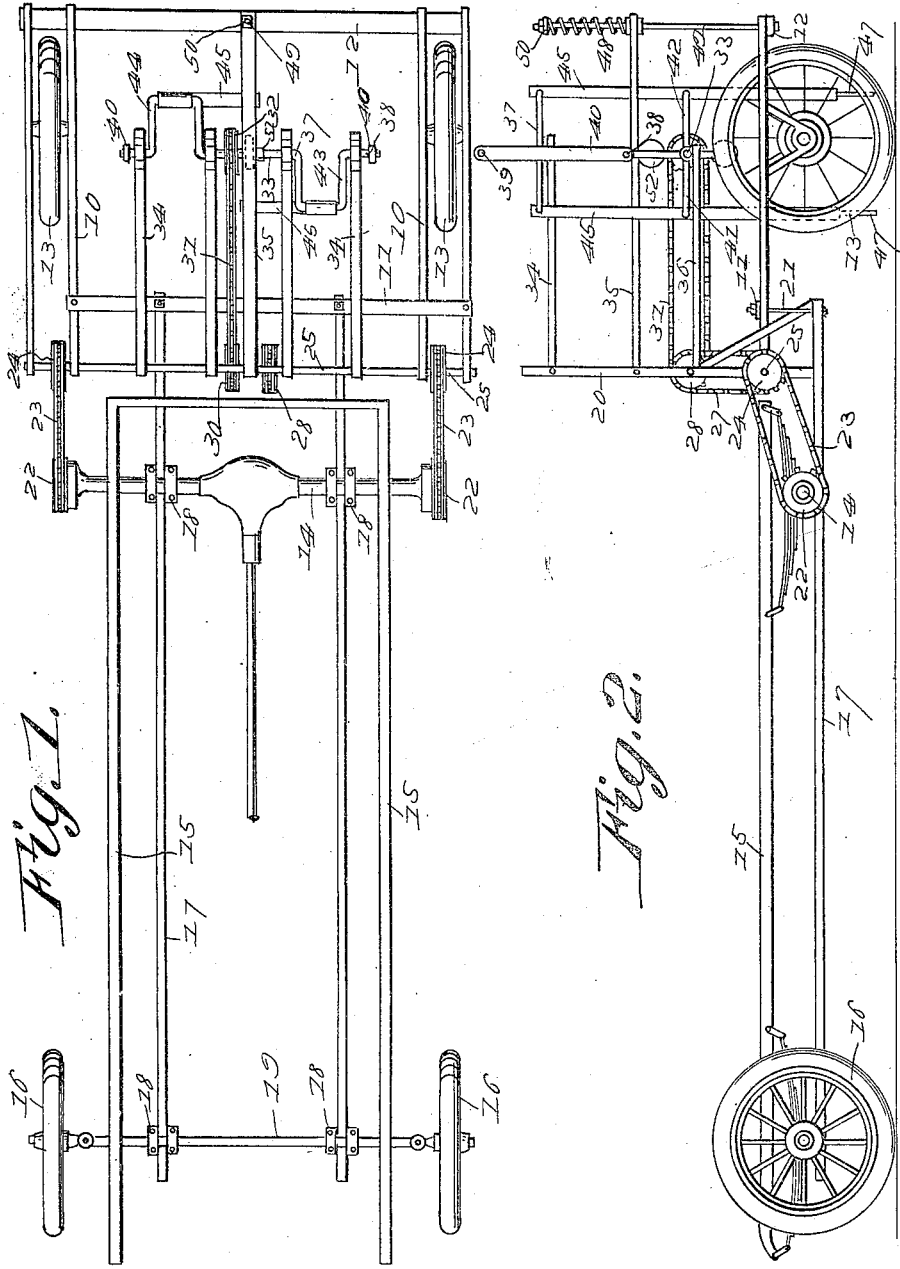

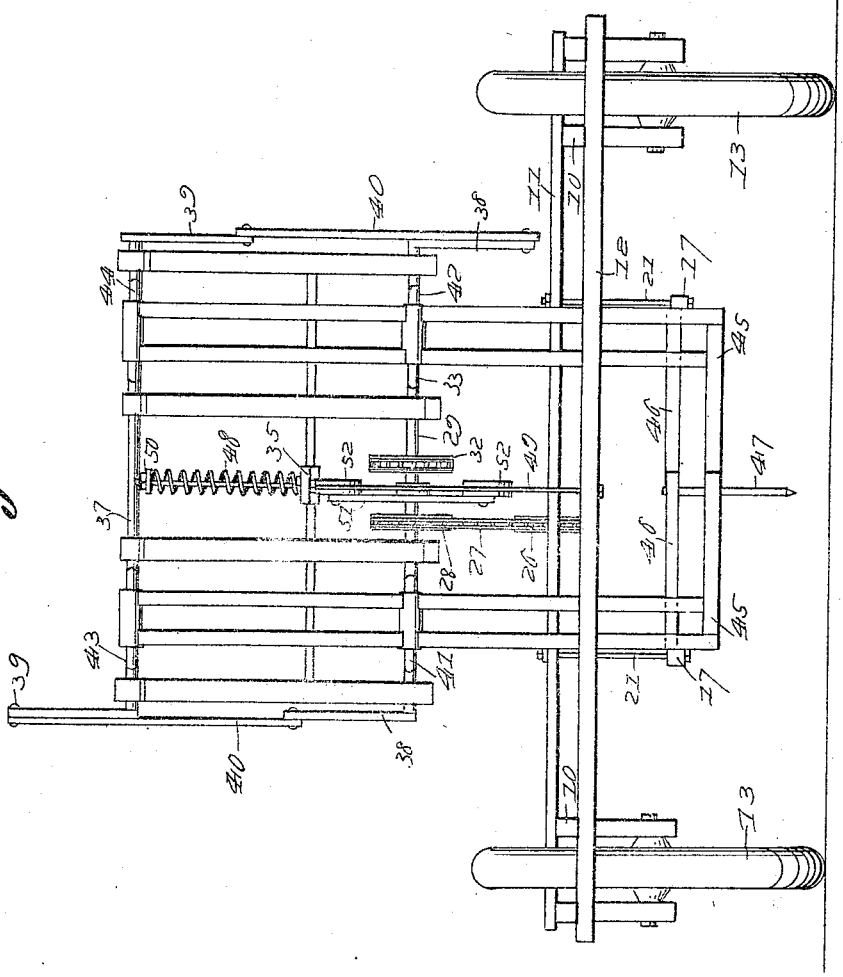

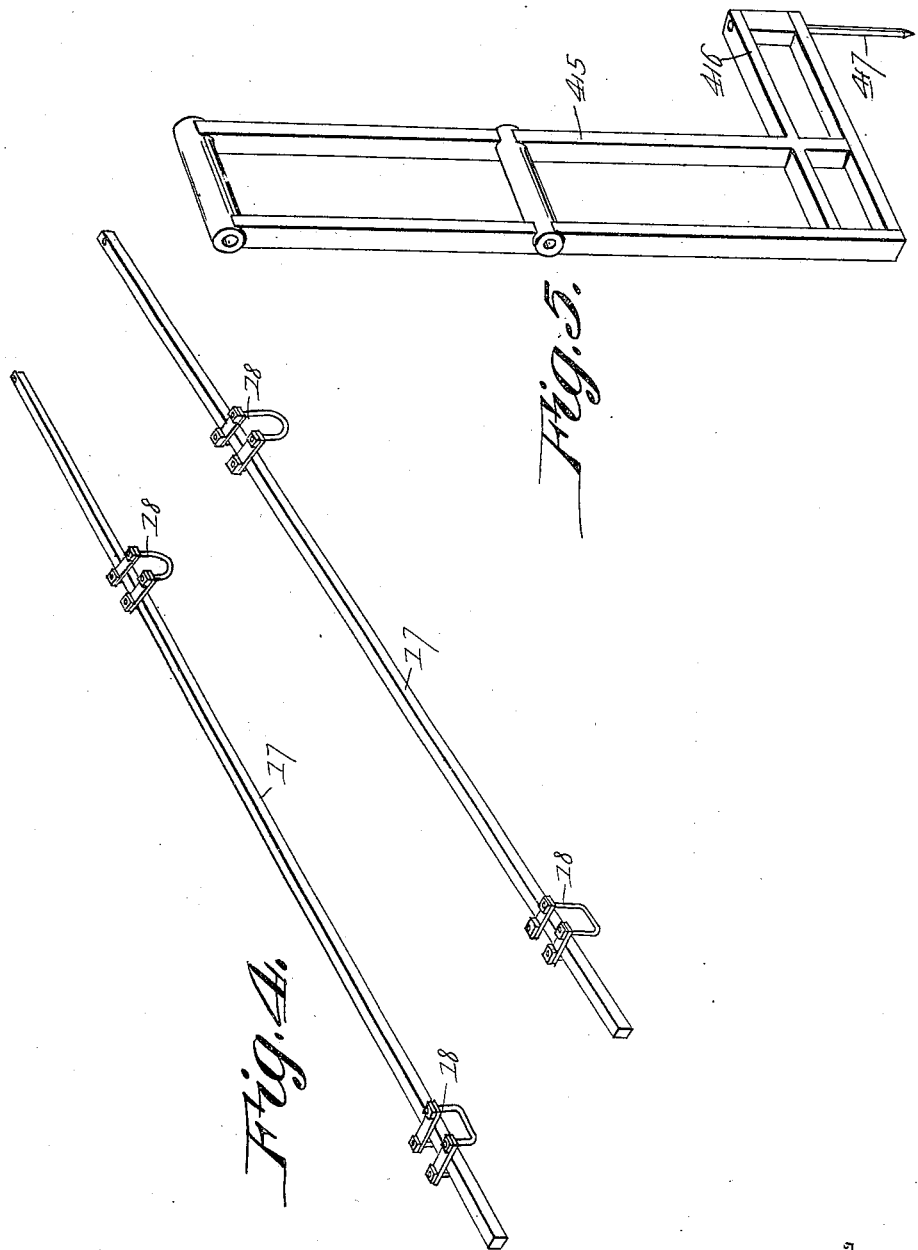

THOMAS J. FELL, OF GREEN RIVER, ILLINOIS.

TRACTION SYSTEM.

1,368,913.  Specification of Letters Patent.  Patented Feb. 15, 1921.

Application filed June 4, 1919. Serial No. 301,611.

*To all whom it may concern:*

Be it known that I, THOMAS J. FELL, a citizen of the United States of America, residing at Green River, in the county of Henry and State of Illinois, have invented new and useful Improvements in Traction Systems, of which the following is a specification.

The object of the invention is to provide a relatively simple and comparatively inexpensive means for producing tractive effect for propelling a vehicle without depending upon the frictional engagement of driving wheels or the equivalents thereof upon the supporting surface and hence without the disadvantages particularly in travel upon heavy muddy or other poorly surfaced roads of vehicles depending upon the ordinary traction means and wherein the slipping and skidding of the latter detract from the efficiency of the motive power and the safety of travel, and to this end the invention consists in a construction, combination and relation of parts of which a preferred embodiment is illustrated in the accompanying drawings, it being understood that changes in form, proportion and details may be resorted to within the scope of the claims without departing from the principles involved.

In the drawings:

Figure 1 is a plan view of the improved tractor applied in the operative position to the chassis of an automobile or similar vehicle.

Fig. 2 is a side view of the same.

Fig. 3 is a rear view.

Fig. 4 is a detail view of the reach bars by means of which connection is made between the tractor and chassis of the vehicle.

Fig. 5 is a detail view of one of the tractor members.

In the illustrated embodiment of the invention there is employed a wheeled frame comprising essentially the side bars 10 and the front and rear bars 11 and 12, the side bars preferably being in duplicate to provide an intervening space for the operation of supporting wheels 13 which take the place of the rear or driving wheels of the vehicle, in connection with which the tractor is to be employed and which may consist of such rear or driving wheels displaced from the driving axle 14 of the vehicle and mounted in the bearings provided on the wheeled frame.

Extending longitudinally of the chassis 15 of the vehicle which may be provided as in the ordinary practice with the front steering wheels 16 and other necessary parts of a vehicle of this type, are the reach bars 17 secured by clips 18 or the equivalents thereof to the front and rear axles 19 and 14 of the vehicle and extending in rear of the latter for connection with and support of the front end of the wheeled frame. Between the front ends of the side bars 10 and said reach bars, are disposed uprights 20 while connecting the rear extremities of said reach bars with intermediate portions of the transverse front bar 11 of the wheeled frame are tension bolts 21, so that the wheeled frame serves as the support of the rear end of the chassis.

In place of the rear or driving wheels which may as above noted be transferred from the axle 14 of the vehicle chassis to the bearings provided for that purpose in the wheeled frame, sprocket wheels 22 may be provided for connection by chains 23 with sprocket wheels 24 on a transverse shaft 25 mounted in suitable bearings on the wheeled frame and preferably adjacent to the plane of the uprights 20.

This shaft 25 constitutes a driving shaft from which motion is communicated through a sprocket 26 thereon and a chain 27 to a sprocket wheel 28 carried by a driven shaft 29 parallel with the driving shaft and also mounted upon the upright members 20 of the wheeled frame, and from this driven shaft motion is communicated through sprocket 30 thereon and a chain 31 to a further sprocket wheel 32 carried by a crank shaft 33, mounted upon a walking frame consisting of arms 34, 35 and 36 extending rearwardly from the uprights 20 of the wheeled frame or any equivalent portion thereof so as to provide for the relatively free movement of the rear ends of said arms. The crank shaft 33 is mounted in bearings in the lowermost set of yielding arms 36 of the walking frame while mounted in corresponding bearings on the uppermost set of arms 34 is a supplemental crank shaft 37, said main and supplemental crank shafts having corresponding terminal arms 38 and 39 connected by links 40 so as to secure a movement of the supplemental crank shaft corresponding with that of the main crank shaft. Carried by the corresponding oppositely extending cranks 41 and 42 of the main crank shaft and 43 and 44 of the supplemental crank shaft are the walking members 45, one of which is shown in detail in Fig. 5 and each of which is maintained in a substantially vertical position while describing a circle determined by the movement of the cranks supporting the same and due to the rotation of the main crank shaft. The feet 46 of said walking members may be provided with ground engaging spurs or pins 47 or may be otherwise shod as found desirable to suit the character of the road bed to be traversed.

The intermediate element of the walking frame represented by the arm 35 is extended rearwardly beyond the plane of the crank shafts and is yieldingly held depressed by means of a spring 48 or the equivalent thereof, the extremity of said arm being fitted for operation upon a tension rod 49 around which the said spring is coiled, the upper end of the spring being engaged by a tension nut 50 by means of which any desired downward pressure may be exerted upon the free end of the arm 35 to resist the action of a cross head 51 carried by the main crank shaft and having radial arms terminally provided with bearing rollers 52. In the rotation of the crank shafts to cause the operation of the walking members the elements of the cross head are thus brought successively into engagement with the pressure bar 35 constituting the intermediate yielding element of the walking frame, so as to cause the downward pressure of said frame, dependent upon the tension of the spring 48, to cause an effective engagement of the feet of the walking members with the road bed.

In operation the effect of this means of propelling a vehicle is to insure a positive advance movement regardless of the condition of the road or the obstacles encountered therein or the resistance offered by the road. Of course, within the range of power of the motor which is being used, and for heavy traffic or the hauling of loads where the element of speed is comparatively negligible, the results to be secured are satisfactory for the fact that one or the other feet of the walking members is almost constantly in engagement with the road bed under such conditions as to prevent slipping and insure the forward movement of the vehicle, and particularly in ascending grades the retrograde movement of the vehicle is prevented even should the engine stall by reason of the positive tractive engagement afforded by the contemplated means. Obviously the force with which the shoe of the walking member may be driven into the surface of the road bed, particularly when it consists as shown of a spur or spike, is dependent entirely upon the tension of the means provided in connection with the walking frame for yieldingly preventing the upward movement thereof, and the effect of this feature of the structure is to avoid excessive strain and breakage due thereto under abnormal conditions.

The invention having been described, what is claimed as new and useful is:

1. A tractor for the purpose indicated having a wheeled frame and means for connecting the same with the chassis of a vehicle to be driven, a vertically oscillatory walking frame mounted upon the wheeled frame, walking members and means for moving the same in circular paths in alternating relation, and yielding means for depressing the walking frame.

2. A tractor for the purpose described having a wheeled frame for supporting the rear end of a vehicle to be driven, an oscillatory walking frame mounted upon the wheeled frame, crank shafts supported by the walking frame, walking members carried by said crank shafts, means for operating the crank shafts, and means for yieldingly holding the oscillatory frame depressed.

3. A tractor for the purpose described having a wheeled frame, an oscillatory walking frame mounted thereon, main and auxiliary crank shafts mounted upon the oscillatory frame, walking members mounted upon corresponding cranks of said shafts, means for operating the crank shafts, and means for depressing the oscillatory frame including a spring and means for adjusting the tension thereof.

4. A tractor for the purpose described having a wheeled frame, an oscillatory walking frame mounted thereon, connected main and auxiliary crank shafts mounted upon the oscillatory frame for synchronous movement, means for driving the main crank shaft, walking members mounted upon corresponding cranks of said shafts and provided at their lower ends with road engaging feet, and means for yieldingly holding the oscillatory frame depressed.

5. A tractor for the purpose named having a wheeled frame, an oscillatory frame, main and auxiliary crank shafts, means for driving said shafts, walking members carried by the crank shafts, said oscillatory frame having a member provided with means for yieldingly holding it in a depressed position, and a cross head carried by one of said crank shafts for periodic engagement with said element.

6. A tractor for the purpose named having a wheeled frame and an oscillatory frame including a bearing arm, a tension rod, a spring carried by the tension rod in engagement with said bearing arm for maintaining the same and the oscillatory frame in a depressed position, a crank shaft having a cross head provided with bearing terminals for engagement successively with said bearing arm, walking members connected with said crank shaft and provided with road engaging feet, and means for operating said crank shaft.

7. A tractor for the purpose indicated having a wheeled frame and means for connecting the same to support the chassis of a vehicle to be driven, a vertically oscillatory walking frame carried by the wheeled frame, walking members carried by the oscillatory frame, and means operable from the power plant of the vehicle for moving the walking members in circular paths.

8. A tractor for the purpose indicated having a wheeled frame and means for connecting the same to support the chassis of a vehicle to be driven, walking members carried by said frame, and means operable from the power plant of the vehicle for moving the walking members in circular paths.

9. A tractor for the purpose indicated having a wheeled frame and means for connecting the same to support the chassis of a vehicle to be driven, a vertically oscillatory walking frame mounted on the wheeled frame, walking members carried by the oscillatory frame, and means operable from the vehicle power plant for moving the walking members in circular paths in alternating relation.

In testimony whereof I affix my signature.

THOMAS J. FELL.